Sept. 27, 1949.    L. R. CROUCH    2,482,843
BLOWTORCH
Original Filed Oct. 13, 1943
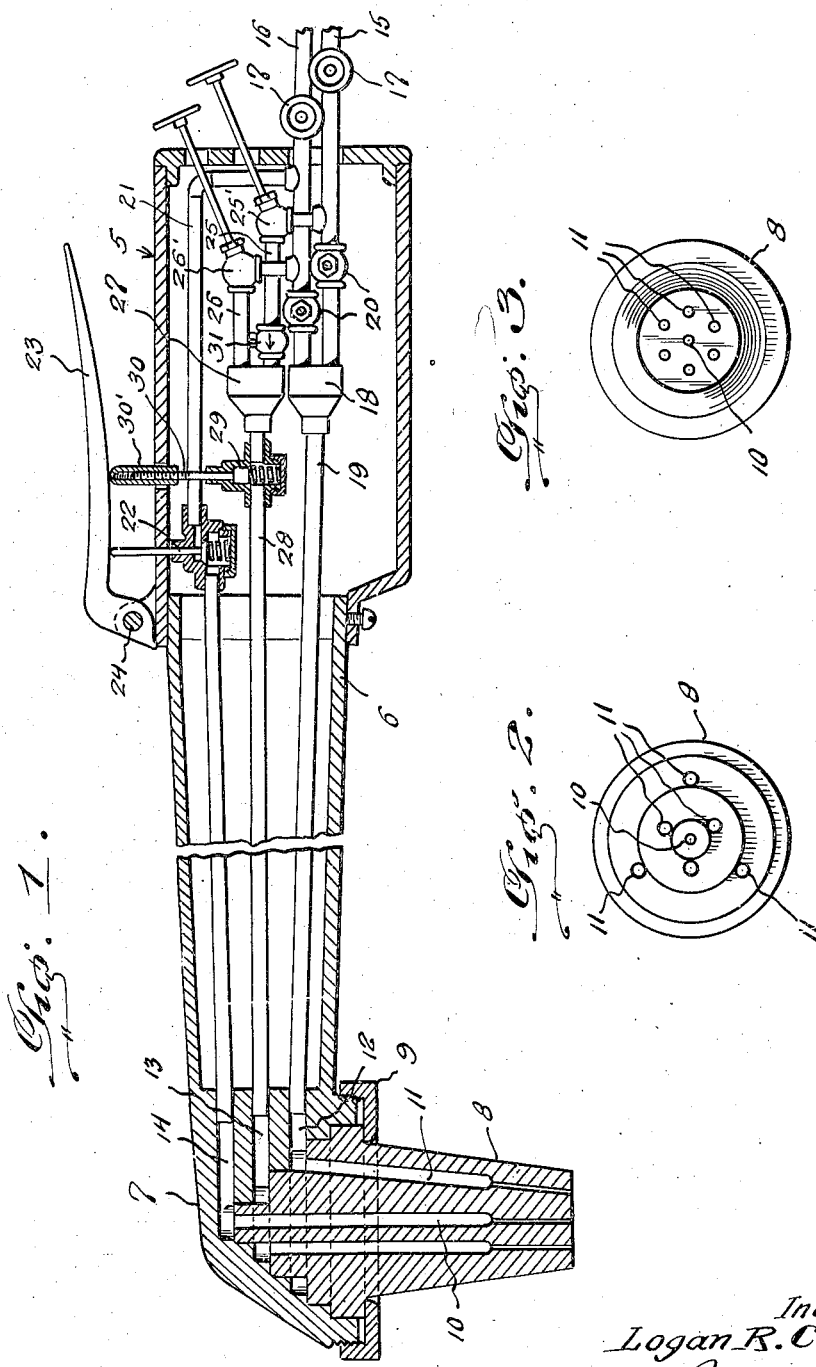
Inventor
Logan R. Crouch,
By
Attorneys Patented Sept. 27, 1949

2,482,843

UNITED STATES PATENT OFFICE 2,482,843

BLOWTORCH

Logan R. Crouch, Jackson, Miss.

Substituted for abandoned application Serial No. 506,102, October 13, 1943. This application July 19, 1946, Serial No. 685,006

4 Claims. (Cl. 158—27.4)

This invention relates to metal cutting torches of the type employing an inflammable gas and oxygen under pressure as a burning fuel for preheating metal to a desired temperature and then discharging along with the heating flame on the metal a concentrated flow of oxygen against the metal to bring about severance thereof. Under some conditions, the oxidization of the metal which takes place during the severing operation increases the temperature of the metal over the desired amount and to prevent said overheating of the metal, it is the primary object of this invention to make provision for automatically reducing the amount of heat to the metal during the severing operation and thereby eliminate overheating of the metal, and which will in no way require additional effort on the part of the operator in using the torch for cutting the metal.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a vertical sectional view illustrating a metal cutting torch constructed in accordance with my invention.

Figure 2 is an end view showing the arrangement of passages or ports in the receiving end of the nozzle of the torch.

Figure 3 is an end view showing the ports in the discharge end of the nozzle of the torch.

Referring in detail to the drawing, the numeral 5 indicates as an entirety a suitable housing of any desired shape and which has detachably connected thereto a sleeve 6 forming an integral part of a head 7 constructed to removably receive a nozzle 8. The head 7 is recessed to receive one end of the nozzle and the walls of the recess are stepped to match the stepped formation of one end of the nozzle.

A retainer ring 9 engages the nozzle 8 and threads on the head 7 for removably securing the nozzle in the head and for bringing about a leak-proof connection between the head and the nozzle.

The nozzle 8 has a centrally arranged passage 10 extending from end to end thereof adapted to deliver a cutting jet. The nozzle is further provided with a group of passages 11 opening outwardly through the discharge end of the nozzle in an annular path, some of the passages 11 open outwardly through one stepped face or end of the nozzle and connect with a passage 12 formed in the head 7, said passages 11 being adapted to deliver a plurality of primary heating jets for preheating a regional area of the metal. Other passages 11 spaced from each other and from the centrally arranged passage 10 open through another stepped face or end of the nozzle and communicate with a passage 13 formed in the head, said passages being adapted to deliver a plurality of secondary heating jets. The central passage 10 communicates with a passage 14 formed in the head 7.

Main feed pipes 15 and 16 equipped with main control valves 17 extend into the housing 5 and connect with a mixing chamber 18 which is in turn connected to the passage 12 by a pipe 19 extending through the sleeve 6 from the housing 5. The main supply pipes 15 and 16 are further provided with regulating valves 20 operable from the exterior of the housing and located in the pipes between the valves 17 and the mixing chamber 18. The main feed pipe 15 is connected to a source of inflammable gas, such as acetylene under pressure, while the main feed pipe 16 is connected to a source of oxygen under pressure. The inflammable gas and oxygen are mixed in the chamber 18 to produce a highly combustible mixture fed from the discharge end of the nozzle by certain of the passages 11.

The feed pipe 16 has connected thereto, within the housing 5, a pipe 21 which extends through the sleeve 6 and connects to the passage 14 of the head 7. A spring seated valve 22 is connected in the pipe 21 and is normally closed with its plunger extending exteriorly of the housing to be engaged by an operating lever 23 pivotally mounted on the housing, as shown at 24. The oxygen pipe 21 connects to the main oxygen feed pipe 16 between the valves 17 and 20 of said main oxygen pipe 16 and when the valve 22 is manually opened, a flow of oxygen escapes at the discharge end of the nozzle by way of the passage 10 in a concentrated flow, the purpose of which is to bring about severance of the metal after the preheating of the metal by the flame from the passages 11. It is to be understood that the torch is manually moved along a given path of the preheated metal to cut the latter. This severance of the metal by the concentrated flow of oxygen as described, brings about an oxidization of the metal which produces excessive heat and results in overheating of the metal. Therefore, it is the primary purpose of the present invention to automatically reduce the heat on the metal used in preheating of said metal when the severing operation starts, and to accomplish this, pipes 25 and 26 equipped with control valves 25' and 26' are connected to the main feed pipes 15 and 16 between the valves 17 and 20 and are connected to a mixing chamber 27. A pipe 28 connects the mixing chamber 27 to the passage 13 of the head 7 which communicates with some of the passages 11.

A spring actuated normally open valve 29 is connected into the pipe 28 between the mixing chamber 27 and the passage 13, and the stem 30 thereof extends exteriorly of the housing 5 adjacent the plunger of the valve 22 to be engaged by the operating lever 23 when the latter is actuated to open the valve 22 bringing about cutting off of the flow of mixed fuel entering the passage 13 and some of the passages 11, reducing the amount of fuel burning at the discharge end of the nozzle at the time of directing the concentrated stream of oxygen against the metal. The amount of heat being subjected to the metal during the severing operation is thus automatically reduced at this time, due to the cutting off of the additional flow of burning fuel through the nozzle by the closing of the valve 29.

The stem 30 is adjustable as to length, as shown at 30', so that the valves 22 and 29 may be made to work together by the lever 23 at any time desired. By shortening the stem 30 the valve 22 may be made to work by the hand lever without operating the valve 29. When the device is thus arranged it will then operate without the automatic feature and as that of an ordinary cutting torch.

A check valve 31 is interposed in the pipe 25 between the mixing chamber 27 and the inflammable gas feed pipe 15. The purpose of the check valve is to prevent oxygen, which is usually used under a higher pressure than the inflammable gas, from entering the main inflammable gas supply pipe 15 when the valve 29 is manually closed.

Thus from the foregoing description, taken in connection with the accompanying drawings, it will be seen that applicant has provided a simple automatic means for reducing the heat to the metal after it has been preheated and at the time of directing the concentrated flow of oxygen to the metal for the severance thereof. As the means of automatically cutting down on the heat to the metal at the time specified is entirely automatic, it requires no additional effort on the part of the operator in using a torch of the kind specified.

While I have described the pipes 25 and 26 as being connected to the main feed pipes 15 and 16, said pipes 25 and 26 may be directly connected to the source of inflammable gas and oxygen, by extending them exteriorly of the housing and providing conventional connections with the sources specified.

While I have shown and described the preferred embodiment of my invention, it will be understood that minor changes in construction, combination and arrangement of parts may be made without departing from the spirit and scope of the invention as claimed.

This application is a substitute of my application Serial No. 506,102, filed October 13, 1943, Blow torch, now abandoned.

Having thus described my invention, what I claim is:

1. In a torch for cutting metal which includes separate means for delivering preheating and oxidizing jets to a work piece from a nozzle, the improvement comprising separate primary and secondary conduits for delivering primary and secondary mixtures of oxidizing and combustible gases to said nozzle, a third conduit for delivering an oxidizing gas to said nozzle, a normally closed valve in said last-named conduit, an adjustable valve in said secondary conduit, said adjustable valve being normally at least partially open, and a single valve control means for opening said first-named valve and simultaneously at least partially closing said adjustable valve.

2. In a torch for cutting metal which includes separate means for delivering preheating and oxidizing jets to a work piece from a nozzle, the improvement comprising separate primary and secondary conduits for delivering primary and secondary mixtures of oxidizing and combustible gases to said nozzle, separate means operatively associated with both of said primary and secondary conduits for selectively varying the gas mixtures in each, a third conduit for delivering an oxidizing gas to said nozzle, a normally closed valve in said last-named conduit, an adjustable valve in said secondary conduit, said adjustable valve being normally at least partially open, and a single valve control means for opening said first-named valve and simultaneously at least partially closing said adjustable valve.

3. In a torch for cutting metal which includes separate means for delivering preheating and oxidizing jets to a work piece from a nozzle, the improvement comprising separate primary and secondary conduits for delivering primary and secondary mixtures of oxidizing and combustible gases to said nozzle, a third conduit for delivering an oxidizing gas to said nozzle, a normally closed valve in said last-named conduit, a normally open valve in one of said secondary and primary conduits, and a single valve control means for opening said first-named valve and simultaneously closing said normally open valve.

4. In a torch for cutting metal which includes separate means for delivering preheating and oxidizing jets to a work piece from a nozzle, the improvement comprising separate primary and secondary conduits for delivering primary and secondary mixtures of oxidizing and combustible gases to said nozzle, separate means operatively associated with both of said primary and secondary conduits for selectively varying the gas mixture in each, a third conduit for delivering an oxidizing gas to said nozzle, a normally closed valve in said last-named conduit, a normally open valve in one of said secondary and primary conduits, and a single valve control means for opening said first-named valve and simultaneously closing said normally open valve.

LOGAN R. CROUCH.

REFERENCES CITED

The following references are of record in the file of this patent:

UNITED STATES PATENTS

| Number | Name | Date |
|---|---|---|
| 709,830 | Snow | Sept. 23, 1902 |
| 1,494,747 | Jenkins | May 20, 1924 |
| 1,537,481 | McCutcheon | May 12, 1925 |
| 1,771,511 | Quelch | July 29, 1930 |
| 2,224,171 | Van Triest | Dec. 10, 1940 |